United States Patent
Matsuo et al.

(10) Patent No.: US 10,909,736 B2
(45) Date of Patent: Feb. 2, 2021

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Takenori Matsuo, Kanagawa (JP); Rumiko Kakehi, Kanagawa (JP); Atsushi Maruyama, Kanagawa (JP); Naoki Okamoto, Kanagawa (JP); Takuya Okamoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 409 days.

(21) Appl. No.: 15/808,335

(22) Filed: Nov. 9, 2017

(65) Prior Publication Data
US 2018/0308270 A1  Oct. 25, 2018

(30) Foreign Application Priority Data
Apr. 19, 2017  (JP) .................. 2017-082923

(51) Int. Cl.
| | | |
|---|---|---|
| G06T 11/60 | (2006.01) | |
| G06K 9/00 | (2006.01) | |
| H04N 1/32 | (2006.01) | |
| G06F 40/247 | (2020.01) | |
| G06F 40/10 | (2020.01) | |

(52) U.S. Cl.
CPC .......... *G06T 11/60* (2013.01); *G06K 9/00442* (2013.01); *H04N 1/32112* (2013.01); *G06F 40/247* (2020.01); *H04N 2201/328* (2013.01); *H04N 2201/3245* (2013.01); *H04N 2201/3266* (2013.01)

(58) Field of Classification Search
None
See application file for complete search history.

(56) References Cited

U.S. PATENT DOCUMENTS

| | | | |
|---|---|---|---|
| 6,088,709 A | 7/2000 | Watanabe | |
| 2009/0210418 A1* | 8/2009 | Arasu | G06F 16/258 |
| 2013/0298000 A1* | 11/2013 | Zuccarino | G06Q 50/01 |
| | | | 715/205 |
| 2014/0033013 A1* | 1/2014 | Shaver | G06F 40/166 |
| | | | 715/230 |
| 2014/0149857 A1* | 5/2014 | Vagell | G06F 40/166 |
| | | | 715/255 |

FOREIGN PATENT DOCUMENTS

| | | |
|---|---|---|
| JP | H08-95965 A | 4/1996 |
| JP | 2005-346376 A | 12/2005 |

* cited by examiner

*Primary Examiner* — Yingchun He
(74) *Attorney, Agent, or Firm* — Oliff PLC

(57) ABSTRACT

An information processing apparatus includes an output unit. When pieces of additional information are extracted, the pieces of additional information being disposed in copies of an identical image and satisfying a predetermined condition, the output unit outputs data in which combined additional information is disposed in the image. The combined additional information is information in which the pieces of additional information are combined.

19 Claims, 15 Drawing Sheets

FIG. 5

| ID | DOCUMENT | PAGE | TYPE | PARENT ID | X COORDINATE | Y COORDINATE | WIDTH | HEIGHT | STRING |
|---|---|---|---|---|---|---|---|---|---|
| 1 | A | 1 | TAG |  | 200 | 10 | 100 | 300 |  |
| 2 | A | 1 | STRING | 1 | 10 | 10 | 50 | 100 | DELETE |
| 3 | B | 3 | STRING |  | 300 | 400 | 100 | 40 | MISSPELLING | ns of the pieces of additional information. Alternatively, when pieces of overlapping or matching additional information are extracted, the output unit 120 generates combined additional information in which the pieces of overlapping or matching additional information are integrated. A display controller 130 causes the display device to display a screen based on the data that is output from the output unit 120. A receiving unit 140 receives operations.

A file to be processed will be described. An identical electronic-document file is distributed to persons. Each person opens the file by using an application, and uses a known information adding function provided for the appli-
INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-082923 filed Apr. 19, 2017.

BACKGROUND

(i) Technical Field

The present invention relates to an information processing apparatus and a non-transitory computer readable medium.

(ii) Related Art

When an identical document is distributed to multiple persons for correction, an operation of collecting the corrected documents and organizing the correction information needs time and effort. Therefore, a technique that aims to achieve efficiency in such an operation has been proposed.

SUMMARY

According to an aspect of the invention, there is provided an information processing apparatus including an output unit. When pieces of additional information are extracted, the pieces of additional information being disposed in copies of an identical image and satisfying a predetermined condition, the output unit outputs data in which combined additional information is disposed in the image. The combined additional information is information in which the pieces of additional information are combined.

BRIEF DESCRIPTION OF THE DRAWINGS

Exemplary embodiment of the present invention will be described in detail based on the following figures, wherein:

FIG. 5 is a diagram illustrating an exemplary additional-information table;

DETAILED DESCRIPTION

An Exemplary Embodiment

An exemplary embodiment for carrying out the present invention will be described.

Figure 1:
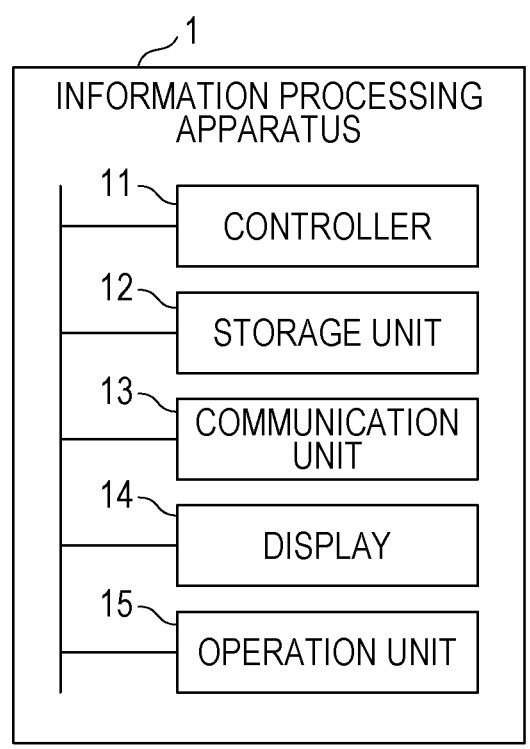
FIG. 1 is a diagram illustrating the hardware configuration of an information processing apparatus.

FIG. 1 is a diagram illustrating the hardware configuration of an information processing apparatus 1. The information processing apparatus 1 includes a controller 11, a storage unit 12, a communication unit 13, a display 14, and an operation unit 15. The storage unit 12 which is a storage device, such as a hard disk drive or a memory, stores programs and data. The controller 11 which includes a processor and a memory used as a work area for computation performs processes according to programs stored in the storage unit 12. The communication unit 13 is a communication interface between the information processing apparatus 1 and external apparatuses, and, for example, includes an interface for a local area network (LAN) and a modem.

The display 14 which includes a display device such as a liquid-crystal display panel displays a graphical user interface (GUI) screen on which widgets for operating the information processing apparatus 1 are disposed. The operation unit 15 which includes a pointing device receives operations on the GUI. Examples of pointing device include a touch panel covering the display surface of the display 14, a mouse, and a touch pad. The display 14 and the operation unit 15 may be configured as an apparatus separate from the information processing apparatus 1.

In the information processing apparatus 1, programs in which the procedure of an additional-information combining process is described are installed. The controller 11 executes the programs. Thus, the functions described below are implemented and the additional-information combining process is performed.

Figure 2:
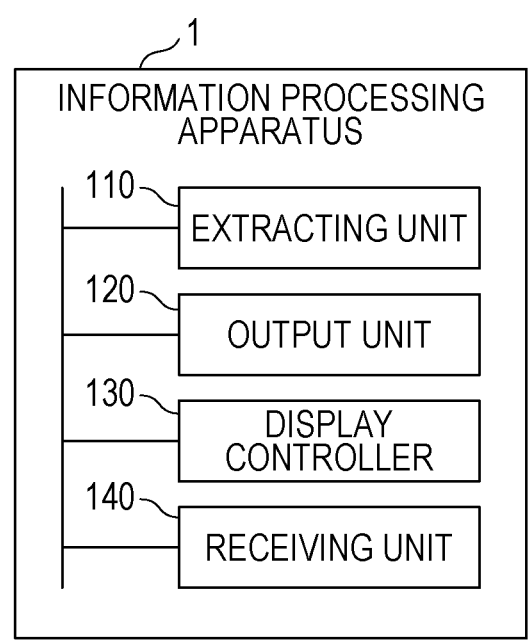
FIG. 2 is a diagram illustrating the functional configuration of the information processing apparatus.

FIG. 2 is a diagram illustrating the functional configuration of the information processing apparatus 1. An extracting unit 110 extracts additional information disposed in multiple copies of an identical image. When the extracting unit extracts pieces of additional information satisfying a predetermined condition, an output unit 120 generates combined additional information in which the pieces of additional information are combined, and outputs data in which the combined additional information is disposed in the image. For example, when pieces of additional information disposed in overlying regions are extracted, the output unit 120 generates combined additional information in which the pieces of additional information are written together, and outputs data in which the combined additional information is disposed in a region of the image which corresponds to the positions of the pieces of additional information. Alternatively, when pieces of overlapping or matching additional information are extracted, the output unit 120 generates combined additional information in which the pieces of overlapping or matching additional information are integrated. A display controller 130 causes the display device to display a screen based on the data that is output from the output unit 120. A receiving unit 140 receives operations.

A file to be processed will be described. An identical electronic-document file is distributed to persons. Each person opens the file by using an application, and uses a known information adding function provided for the application so as to add information to the file. Information added to the file by using the information adding function is called additional information. The information adding function encompasses, for example, a function of pasting a virtual tag on a page, a function of writing a string in a virtual tag, and a function of writing a string and a mark on a page. A mark is, for example, a line segment drawn along a string, a rectangle surrounding a string, or a circle mark. A virtual tag, a string, a mark, and the like are regarded as additional information.

The data structure of a file is a tree structure. A file includes one or more pages. To each page, one or more pieces of additional information may be added. When this structure is expressed as a tree structure, one or more pages are associated as descendant nodes of a file, and one or more pieces of additional information are associated as descendant nodes of a page.

To a piece of additional information, another piece or other pieces of additional information may be added. For example, when a string is written in a tag pasted on a page, the tag itself is additional information, and the string is additional information added to the tag. When this structure is expressed as a tree structure, a piece of additional information (string) is associated as a descendant node of a piece of additional information (tag). Thus, when a piece of additional information is associated with a piece of additional information, the piece of additional information that serves as an ancestor is called parent information, and the piece of additional information that serves as a descendant is called child information. A tag is additional information that may serve as parent information.

A user collects files to which additional information has been added, and inputs the collected files to the information processing apparatus 1. When the user instructs the information processing apparatus 1 to perform the additional-information combining process, the controller 11 starts the additional-information combining process.

Figure 3:
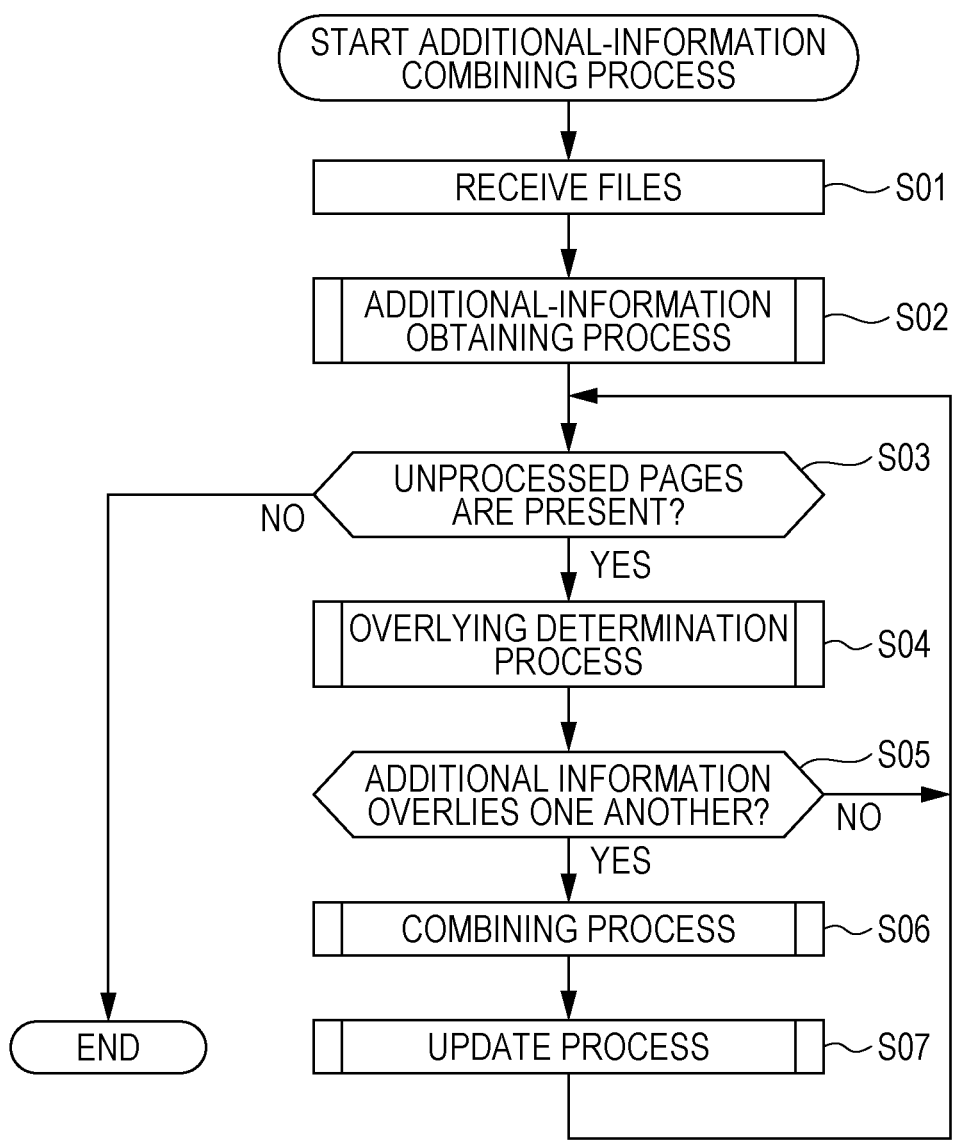
FIG. 3 is a schematic flowchart of an additional-information combining process.

FIG. 3 is a schematic flowchart of the additional-information combining process. First, the information processing apparatus 1 receives files (step S01). Then, the controller 11 obtains additional information from each of the files, and stores the obtained additional information in the storage unit 12 (step S02 in which an additional-information obtaining process is performed). Then, the controller 11 determines whether or not unprocessed pages are present. If unprocessed pages are present, (NO in step S03), the controller 11 ends the additional-information combining process. If unprocessed pages are present (YES in step S03), the process proceeds to step S04.

In step S04, the controller 11 determines whether or not, for one of the unprocessed pages, pieces of additional information obtained from the files overlie each other (step S04 in which an overlying determination process is performed). If no pieces of additional information overlie each other (NO in step S05), the process of the controller 11 returns to step S03. If the pieces of additional information overlie each other (YES in step S05), the controller 11 generates combined additional information in which the pieces of additional information that overlie each other are combined (step S06 in which a combining process is performed). Then, the controller 11 updates the file image by using the combined additional information (step S07 in which an update process is performed), and repeatedly performs processes in step S03 and its subsequent steps. Steps S02, S04, S06, and S07 will be described in detail.

Figure 4:
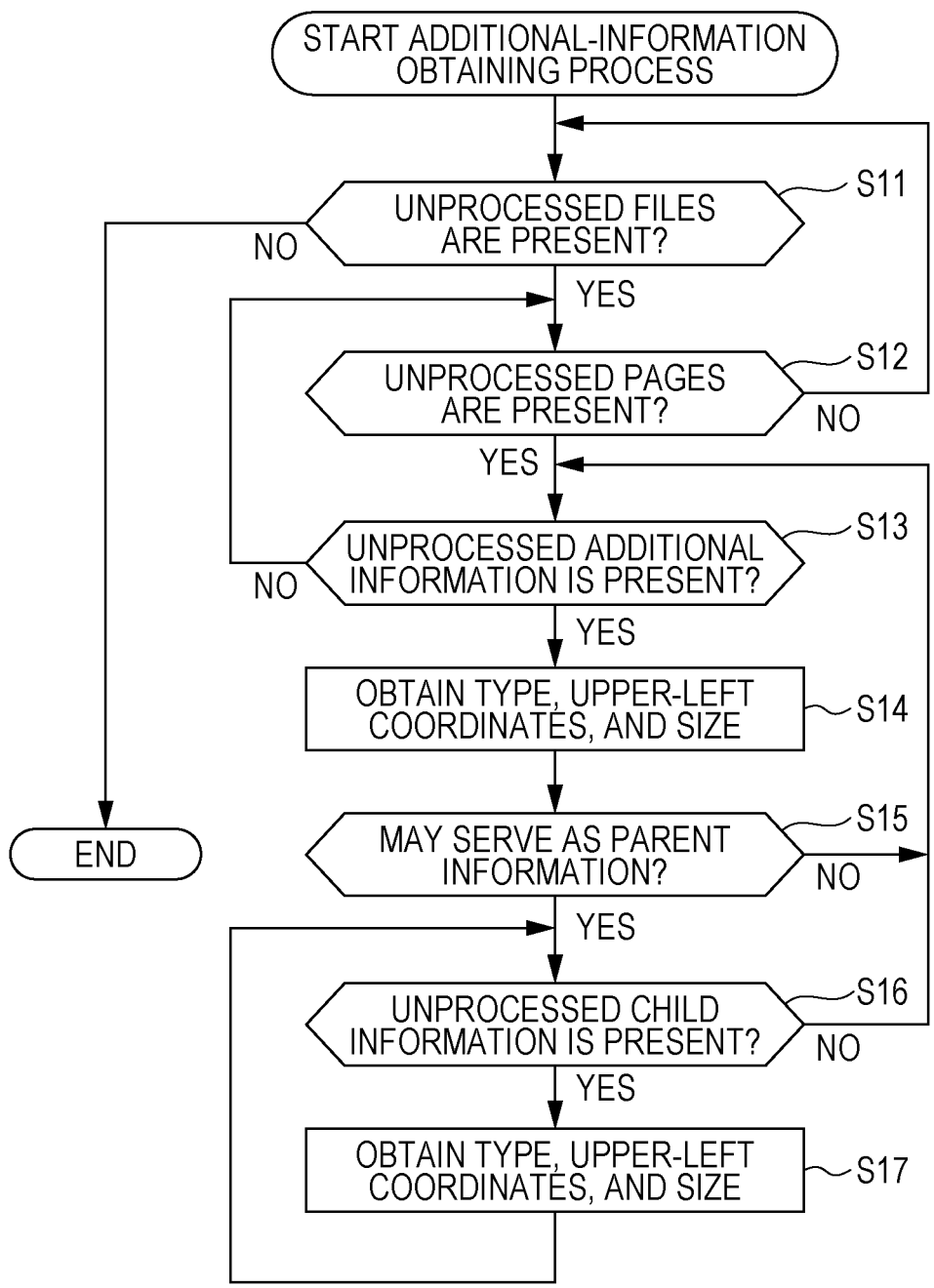
FIG. 4 is a flowchart of an additional-information obtaining process (step S02)

FIG. 4 is a flowchart of the additional-information obtaining process (step S02). First, the controller 11 determines whether or not unprocessed files, that is, files that have not been subjected to the additional-information obtaining process, are present. If unprocessed files are not present (NO in step S11), the controller 11 ends the additional-information obtaining process. If unprocessed files are present (YES in step S11), the controller 11 performs the following processes on one of the unprocessed files.

In step S12, the controller 11 determines whether or not unprocessed pages that are associated with the file are present from the tree structure of the file. If such unprocessed pages are not present (NO in step S12), the process returns to step S11. If such unprocessed pages are present (YES in step S12), the controller 11 determines whether or not, for one of the unprocessed pages, unprocessed additional information that is associated with the page is present from the tree structure of the file. If such unprocessed additional information is not present (NO in step S13), the controller 11 repeatedly performs the process in step S12. If such unprocessed additional information is present (YES in step S13), the controller 11 obtains the type, the upper-left coordinates, and the size of one piece included in the unprocessed additional information (step S14).

Then, the controller 11 determines whether or not it is possible for the piece of additional information to serve as parent information from the type of the piece of additional information. The type of additional information which may serve as parent information is, for example, a tag. If it is not possible for the piece of additional information to serve as parent information (NO in step S15), the controller 11 repeatedly performs the process in step S13. If it is possible for the piece of additional information to serve as parent information (YES in step S15), the controller 11 determines whether or not unprocessed child information that is associated with the piece of additional information is present from the tree structure of the file. If such unprocessed child information is not present (NO in step S16), the controller 11 repeatedly performs the processes in step S13 and its subsequent steps. If such unprocessed child information is present (YES in step S16), the controller 11 obtains the type, the upper-left coordinates value, and the size of one piece included in the unprocessed child information (step S17), and repeatedly performs the process in step S16. The procedure of the additional-information obtaining process is described above.

FIG. 5 illustrates an exemplary additional-information table. The controller 11 provides an ID to obtained additional information, and writes the following information in association with the ID in the additional-information table. Data "DOCUMENT" indicates an identifier (for example, a file name) indicating the document from which the additional information is obtained. Data "PAGE" indicates the page number of a page from which the additional information is obtained. Data "TYPE" indicates the type of the additional information. The type is, for example, a tag, a string, a mark, or the like. Data "PARENT ID" indicates the ID of parent information with which the additional information is associated as child information. In this example, the additional information whose ID is 1 is stored as parent information, and the additional information whose ID is 2 is associated as child information. In this example, a tag serves as parent information, and a string written in the tag serves as child information. Data "X COORDINATE", "Y COORDINATE", "WIDTH", and "HEIGHT" indicates the upper-left x coordinate, the upper-left y coordinate, the width, and the height of the additional information. When the additional information indicates a string, a mark, or the like, the x coordinate, the y coordinate, the width, and the height of a circumscribed rectangle of the additional information may be obtained. Data "STRING" indicates a string included in the additional information.

Figure 6:
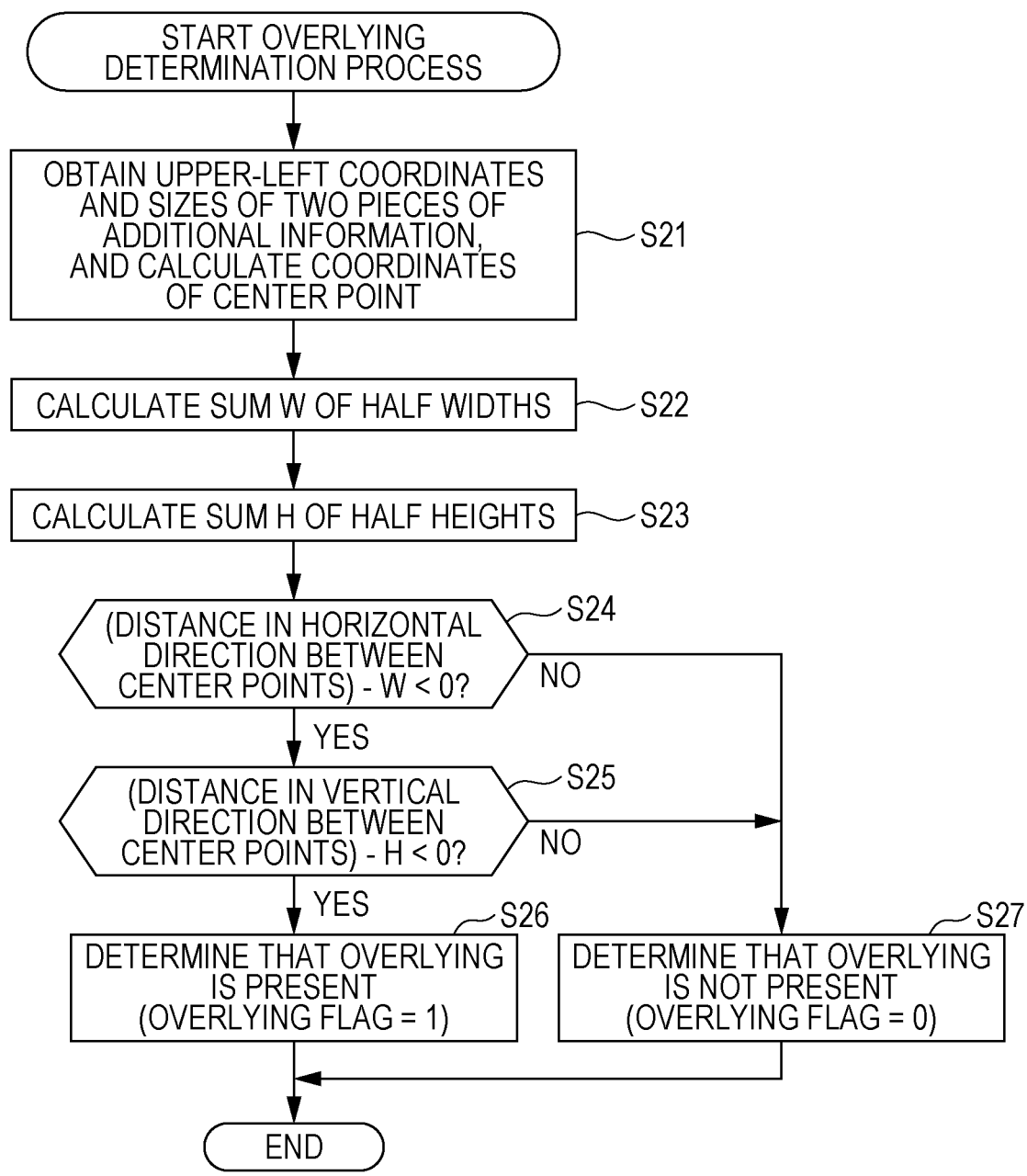
FIG. 6 is a flowchart of an overlying determination process (step S04)

FIG. 6 is a flowchart of the overlying determination process (step S04). When pieces of additional information are obtained from pages that correspond to the identical page number and that are included in multiple copies of the file, the controller 11 performs the overlying determination process on a combination of any two pieces of additional information among the pieces of additional information in a round-robin manner.

First, the controller 11 obtains the upper-left coordinates and the sizes of two pieces of additional information, and calculates the coordinates of the center point of each piece of additional information (step S21). Then, the controller 11 calculates the sum W of half the widths of the two pieces of additional information (step S22). Then, the controller 11 calculates the sum H of half the heights of the two pieces of additional information (step S23). Then, the controller 11 substrates W from the distance in the horizontal direction between the center points of the two pieces of additional information. If the subtraction value is negative (YES in step S24), H is subtracted from the distance in the vertical direction between the center points of the two pieces of additional information. If the subtraction value is negative (YES in step S25), the controller 11 determines that the regions of the two pieces of additional information overlie each other, and sets 1 to an overlying flag (step S26). The controller 11 stores a combination of the two pieces of additional information in association with the overlying flag. In contrast, if the determination result in step S24 or S25 is NO, the controller 11 determines that the regions of the two pieces of additional information do not overlie each other, and sets 0 to the overlying flag (step S27). The procedure of the overlying determination process is described above.

Figure 7:
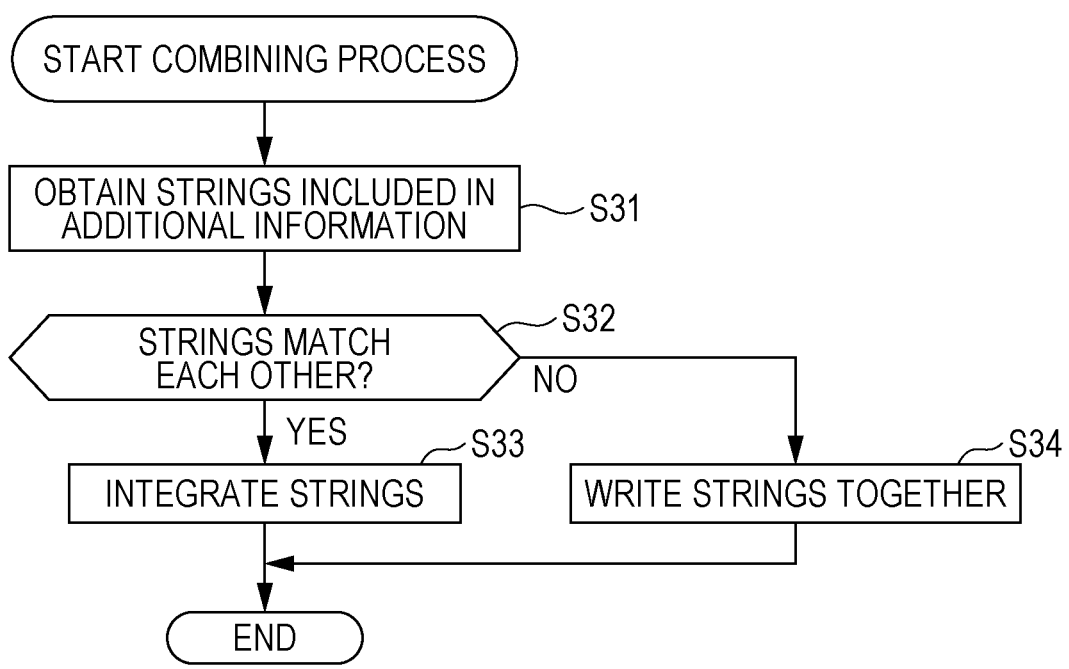
FIG. 7 is a flowchart of a combining process (step S06)

FIG. 7 is a flowchart of the combining process (step S06). This process is performed on a combination of pieces of additional information for which an overlying flag is set to 1 in step S04. First, the controller 11 obtains strings included in the pieces of additional information from the additional-information table (step S31). Then, the controller 11 determines whether or not the obtained strings match each other. If the strings match each other (YES in step S32), the controller 11 generates combined additional information in which the strings matching each other are integrated (step S33). If the strings do not match each other (NO in step S32), the controller 11 generates combined additional information in which these strings are written together (step S34). The procedure of the combining process is described above.

Figure 8:
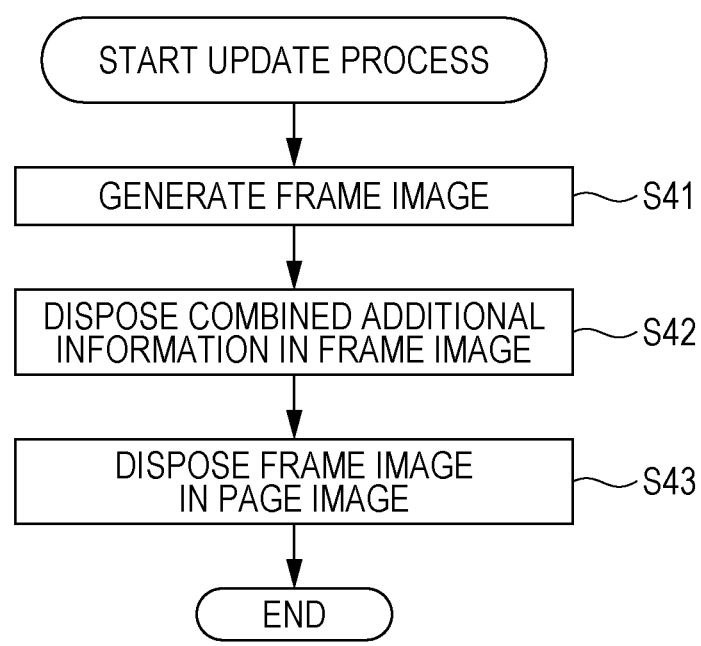
FIG. 8 is a detailed flowchart of an update process (step S07)

FIG. 8 is a flowchart of the update process (step S07). First, the controller 11 generates a frame image (step S41). The frame is, for example, a rectangular frame. By coloring the background inside the frame, a virtual-tag image may be generated. In this case, it is desirable that the background inside the frame be colored with a different color from that of the background of the page. The color of the frame may be same as the color of the background inside the frame, or may be different from the color of the background inside the frame. Then, the controller 11 disposes the combined additional information in the frame image (step S42), and outputs data in which a frame image in which the combined additional information is disposed is disposed in the page image that is an image before addition of additional information (step S43). The procedure of the update process is described above. For example, the data is output to the display device so that a page on which combined additional information is disposed is displayed. In addition, the data is output to a printer so that a page on which combined additional information is disposed is printed.

Figure 9A:
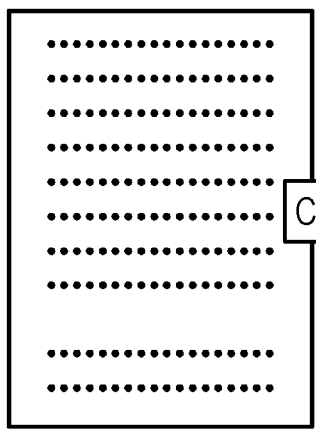
FIGS. 9A to 9D are diagrams illustrating exemplary combination of additional information.
Figure 9B:
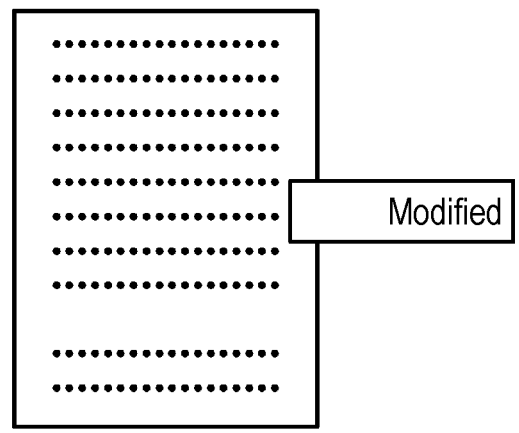
Figure 9C:
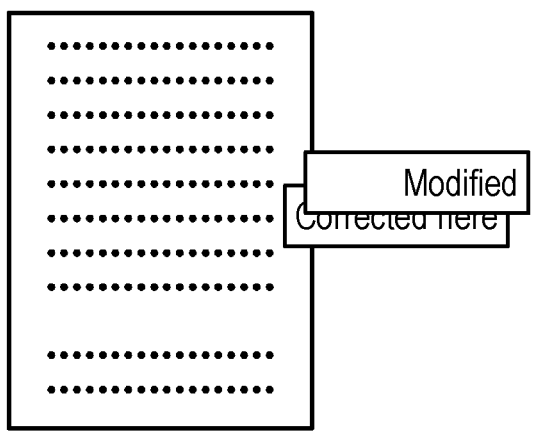
Figure 9D:
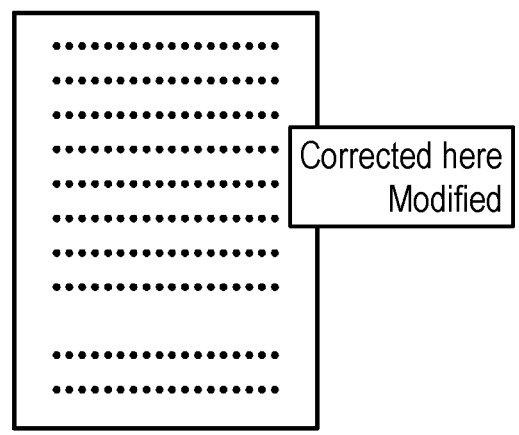

FIGS. 9A to 9D illustrate exemplary combination of additional information. FIGS. 9A and 9B illustrate examples in which two different persons have pasted virtual tags as additional information on an identical page. When the examples in FIGS. 9A and 9B are simply put together, as illustrated in FIG. 9C, the two tag regions overlie each other. Therefore, it is determined that overlying has been occurred, in the overlying determination process. Since the strings written in the two tags do not match each other, combined additional information in which these strings are written together is generated in the combining process. As a result, as illustrated in FIG. 9D, an image in which the strings in the two tags obtained before combination are written together in a single tag is generated.

MODIFIED EXAMPLES

The above-described exemplary embodiment may be modified as follows.

First Modified Example

The following configuration may be employed. The extracting unit extracts attribute information associated with additional information. The output unit generates combined additional information indicating association between pieces of additional information and attribute information.

Figure 10A:
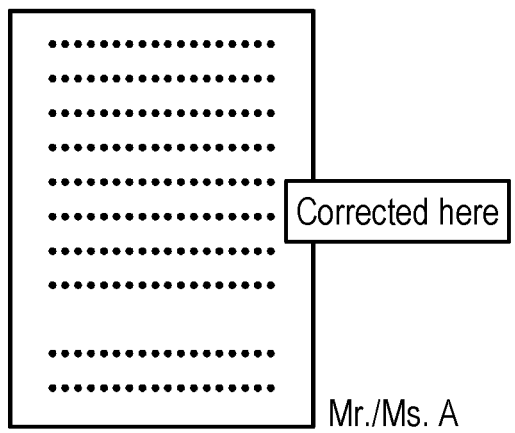
FIGS. 10A to 10D are diagrams illustrating exemplary combination of additional information.
Figure 10B:
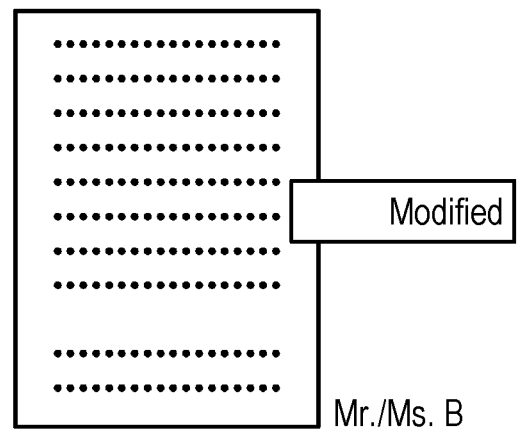
Figure 10C:
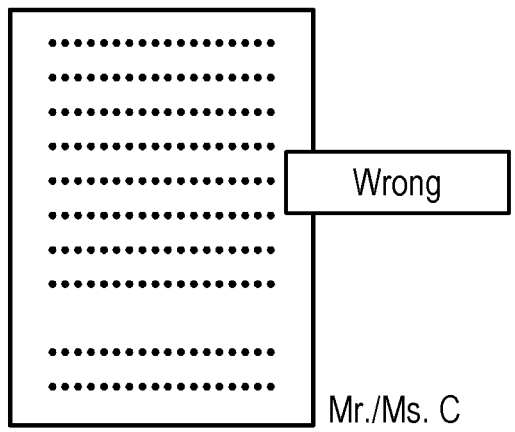
Figure 10D:
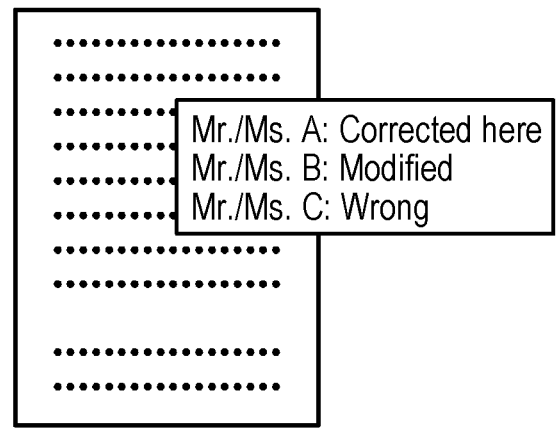

FIGS. 10A to 10D illustrate exemplary combination of additional information. FIGS. 10A to 10C illustrate an example in which three different persons have pasted virtual tags on the identical page. A dot line drawn in each page indicates a string. When examples in FIGS. 10A to 10C are simply put together, the three tag regions overlie one another. Therefore, in the overlying determination process, it is determined that overlying has occurred. In the first modified example, in step S31 in the combining process (FIG. 7), the controller 11 obtains strings and attribute information for additional information. The attribute information describes, for example, a creator's name, and is obtained from the properties of a file. In step S34, the controller 11 writes the strings together, and also writes pieces of attribute information corresponding to the respective strings. As a result, as illustrated in FIG. 10D, an image in which the strings in the three tags before combination and attribute information (in this example, creator's names) are written in a single tag is generated.

Second Modified Example

The following configuration may be employed. A display controller and a receiving unit are included. The display controller causes a display device to display a screen based on data which is output from the output unit. The receiving unit receives operations. When an operation of selecting attribute information is received, the output unit outputs data such that additional information associated with the selected attribute information is displayed in a display state different from the display state for additional information associated with attribute information that has not been selected.

Figure 11A:
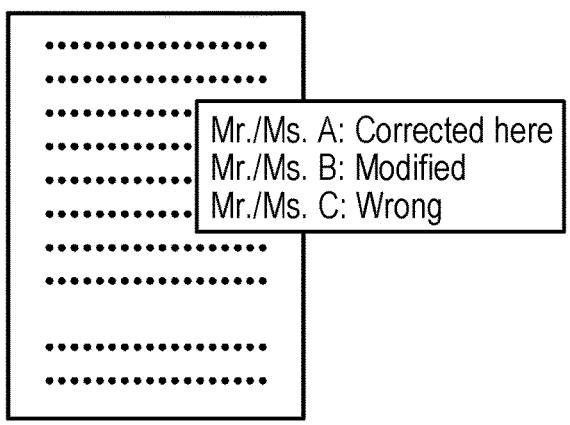
FIGS. 11A to 11C are diagrams illustrating exemplary combination of additional information.
Figure 11B:
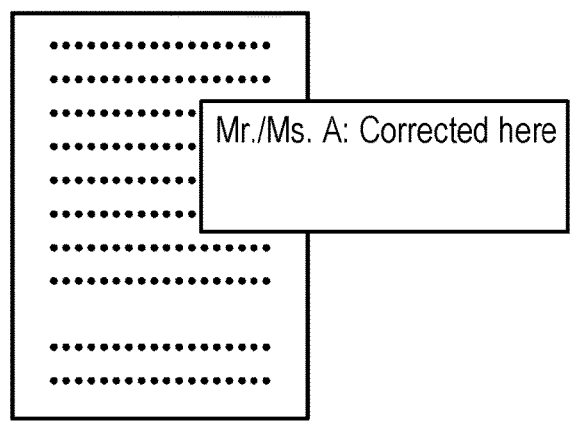
Figure 11C:
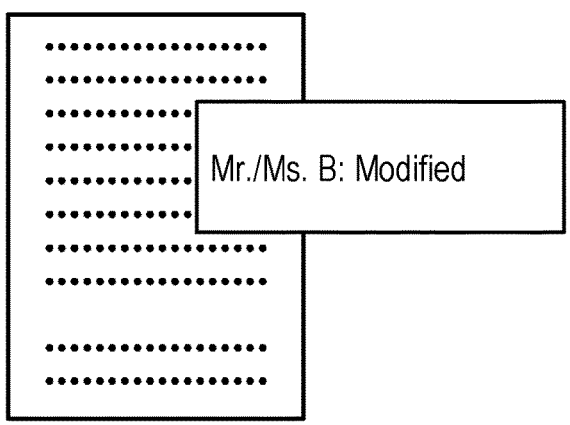

FIGS. 11A to 11C illustrate exemplary combination of additional information. FIG. 11A illustrates the exemplary display illustrated in FIG. 10D. In the second modified example, a user performs an operation of selecting one of pieces of displayed attribute information (in this example, creator's names). For example, a pointing device may be used to select attribute information, or a widget for inputting attribute information that is to be selected may be displayed. When attribute information "Mr./Ms. A" is selected, as illustrated in FIG. 11B, additional information (in this example, a string) corresponding to Mr./Ms. A is displayed, and additional information corresponding to Mr./Ms. B and Mr./Ms. C is not displayed. When the attribute information "Mr./Ms. B" is selected, as illustrated in FIG. 11C, additional information (in this example, a string) corresponding to Mr./Ms. B is displayed. Additional information corresponding to Mr./Ms. B and Mr./Ms. C may be displayed with lower density than the density of the additional information corresponding to Mr./Ms. A, or does not need to be displayed at all.

Third Modified Example

Figure 12A:
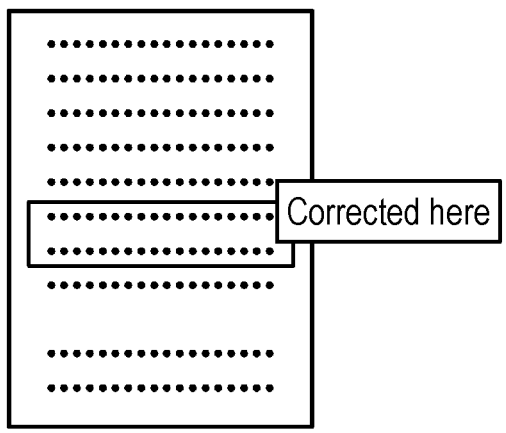
FIGS. 12A to 12C are diagrams illustrating exemplary combination of additional information.
Figure 12B:
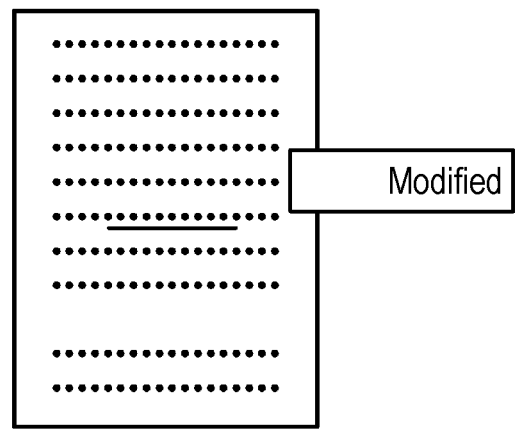
Figure 12C:
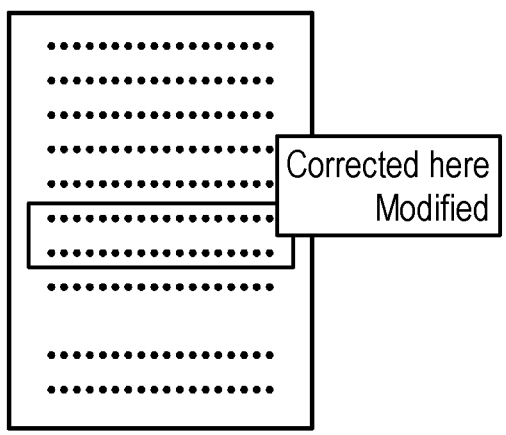

FIGS. 12A to 12C illustrate exemplary combination of additional information. FIG. 12A illustrates an example in which, in addition to a tag, a rectangle surrounding document text is drawn. FIG. 12B illustrates an example in which, in addition to a tag, a line segment along document text is drawn. In the overlying determination process, a circumscribed rectangle for a string group under which the line segment in FIG. 12B is drawn is obtained. It is determined that the rectangular region in FIG. 12A and the region of the circumscribed rectangle in FIG. 12B overlie each other. In the combining process, the rectangle in FIG. 12A may be written with the line segment in FIG. 12B, or only a larger region among the rectangular region in FIG. 12A and the region of the circumscribed rectangle in FIG. 12B may be displayed. In this example, since the rectangular region in FIG. 12A is larger, as illustrated in FIG. 12C, only the rectangle in FIG. 12A is displayed.

Fourth Modified Example

A configuration may be employed in which the output unit generates combined additional information in which pieces of additional information referring to synonyms are integrated.

Figure 13:
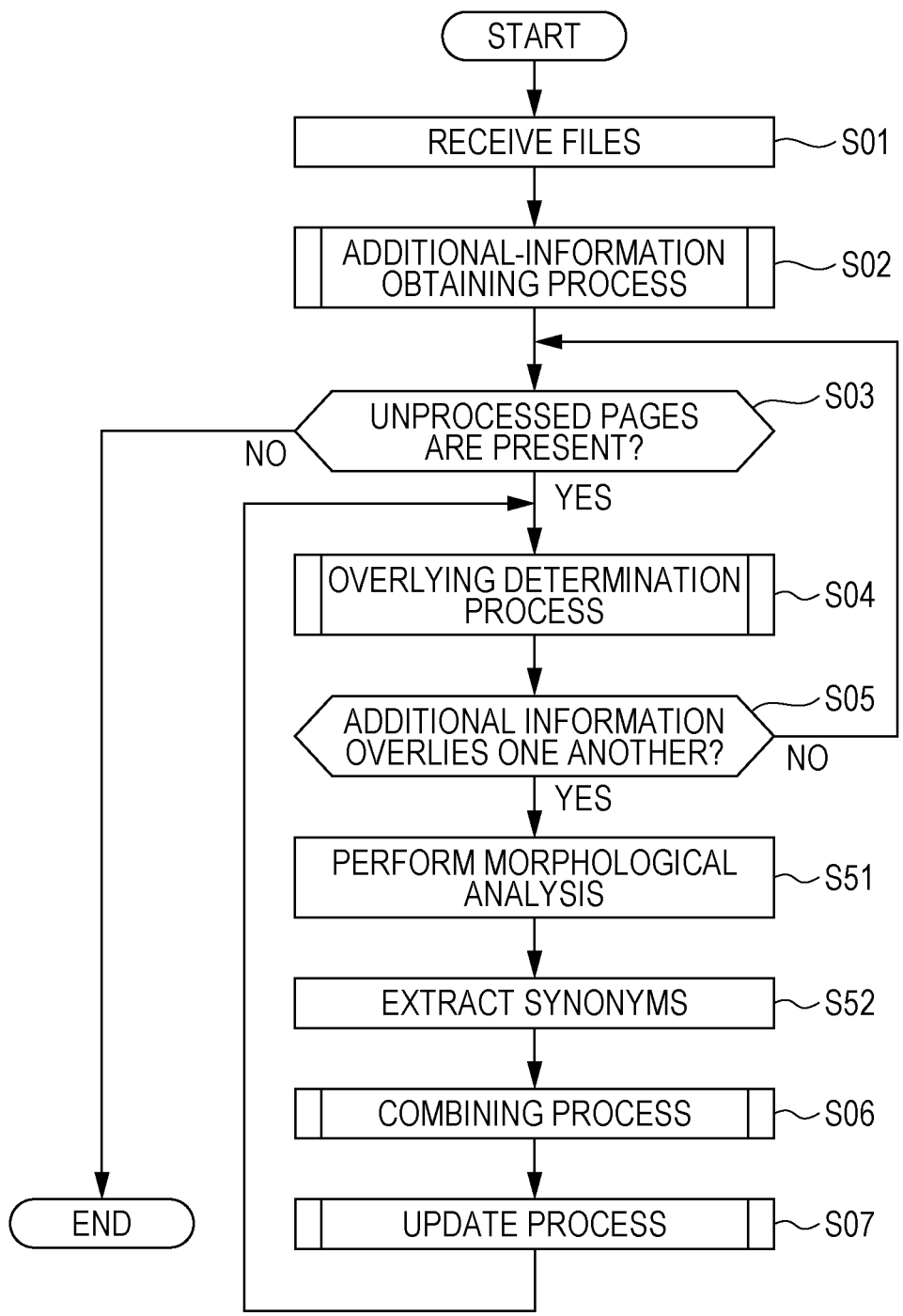
FIG. 13 is a flowchart of an additional-information combining process.

FIG. 13 is a flowchart of an additional-information combining process. Steps S01 to S05 and steps S06 to S07 are same as those in the above-described exemplary embodiment (FIG. 3). In step S51, the controller 11 performs a morphological analysis on pieces of additional information determined to overlie one another, and extracts words. In step S52, the controller 11 extracts synonyms of the extracted words from a dictionary. In the combining process, the controller 11 integrates additional information referring to synonyms.

Figure 14A:
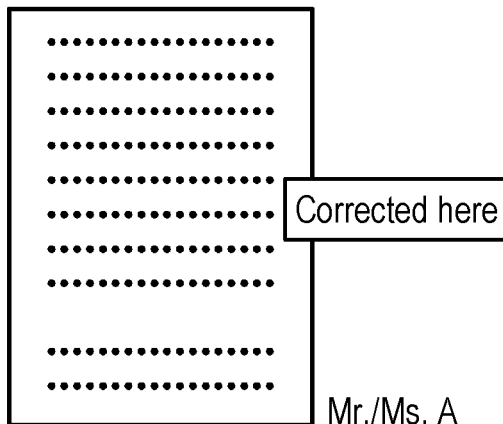
FIGS. 14A to 14D are diagrams illustrating exemplary combination of additional information.
Figure 14B:
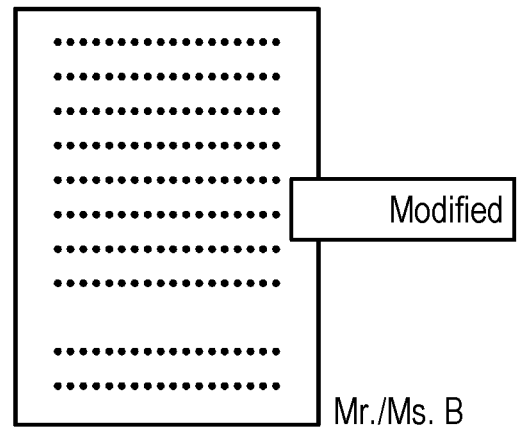
Figure 14C:
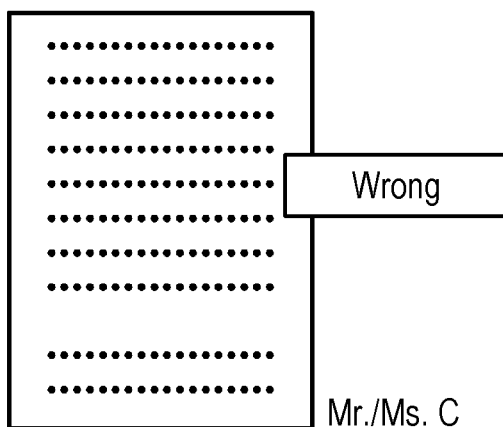
Figure 14D:
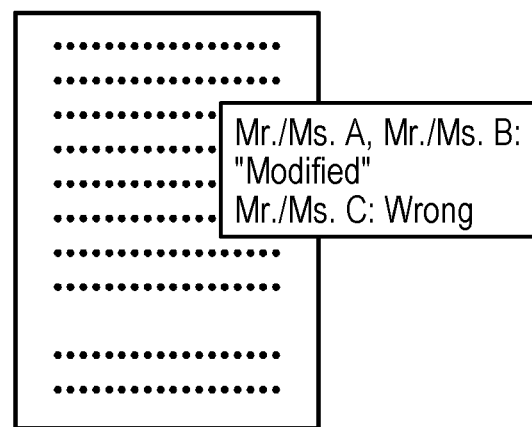

FIGS. 14A to 14D illustrate exemplary combination of additional information. In this example, it is determined that "Corrected" in a tag in FIG. 14A is a synonym of "Modified" in a tag in FIG. 14B. As illustrated in FIG. 14D, the strings are integrated into "Modified" which is written in a tag.

Figure 15A:
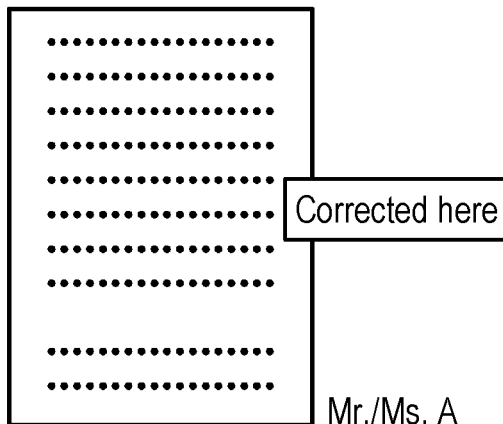
FIGS. 15A to 15D are diagrams illustrating exemplary combination of additional information.
Figure 15B:
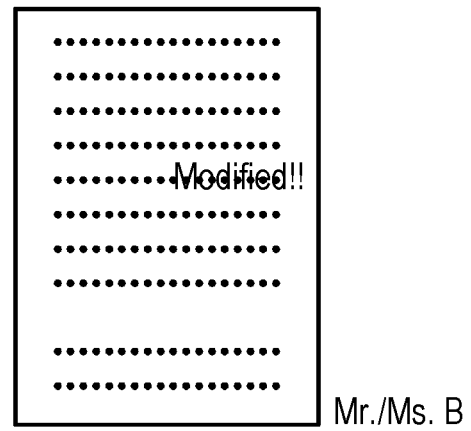
Figure 15C:
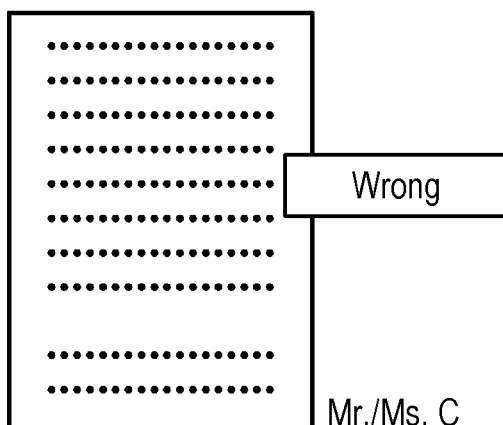
Figure 15D:
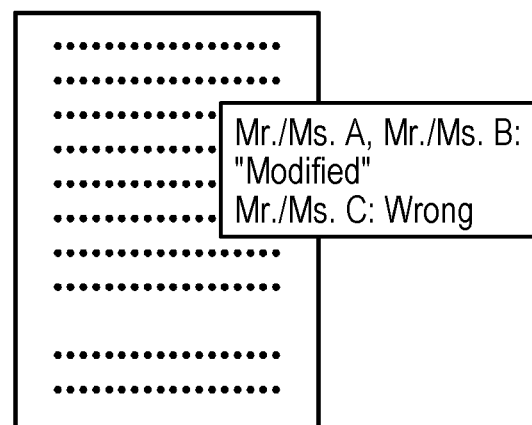

FIGS. 15A to 15D illustrate exemplary combination of additional information. FIG. 15B illustrates an example in which additional information is written on a page. In this example, it is determined that "Corrected" in a tag in FIG. 15A is a synonym of "Modified" written on a page in FIG. 15B. As illustrated in FIG. 15D, the strings are integrated into "Modified" which is written in a tag.

A configuration may be employed in which the output unit generates combined additional information in which pieces of additional information having strings for which the degree of similarity is equal to or larger than a threshold are integrated. For example, when multiple strings contain common characters, a ratio of the number of common characters with respect to the number of characters in an original string may be used as the degree of similarity. Alternatively, when multiple strings contain common words, a ratio of the number of characters in the common words with respect to the number of characters in an original string may be used as the degree of similarity.

Fifth Modified Example

A program that causes a computer to perform the above-described processes may be provided by storing the program persistently in a computer-readable recording medium, such as an optical recording medium or a semiconductor memory, or may be provided through a communication network such as the Internet. When a program according to the exemplary embodiment of the present invention is provided by storing the program persistently in a recording medium, a computer reads, for use, the program from the recording medium. When the program according to the exemplary embodiment of the present invention is provided through a communication network, a computer receives, for use, the program from a distribution source apparatus.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory configured to store instructions; and
a controller configured execute the instructions to output data in which combined additional information is disposed in an image when content of a plurality of pieces of additional information matches, wherein
the plurality of pieces of additional information are disposed in a plurality of copies of an identical image, and
the combined additional information is information in which the plurality of pieces of additional information are integrated.

2. The information processing apparatus according to claim 1,
wherein the content of the plurality of pieces of additional information matches when the plurality of pieces of additional information are disposed in overlying regions and the controller outputs the data in which the combined additional information is disposed in a region of the image, the combined additional information being information in which the plurality of pieces of additional information are written together, the region corresponding to the plurality of pieces of additional information.

3. The information processing apparatus according to claim 2,
wherein the controller outputs the combined additional information indicating association between the plurality of pieces of additional information and attribute information associated with the plurality of pieces of additional information.

4. The information processing apparatus according to claim 3, wherein:
the controller that causes a display device to display a screen based on the data which is output from the controller;
the controller receives an operation; and
when an operation of selecting the attribute information is received, the controller outputs the data in which a display state of additional information associated with the selected attribute information is different from a display state of additional information associated with attribute information that is not selected.

5. The information processing apparatus according to claim 3,
wherein the content of the plurality of pieces of additional information matches when the plurality of pieces of additional information overlap one another.

6. The information processing apparatus according to claim 5,
wherein the controller outputs the combined additional information in which the plurality of pieces of additional information referring to a synonym are integrated.

7. The information processing apparatus according to claim 5,
wherein the controller outputs the combined additional information in which the plurality of pieces of additional information are integrated, the plurality of pieces of additional information having strings for which a degree of similarity is equal to or larger than a threshold.

8. The information processing apparatus according to claim 2,
wherein the content of the plurality of pieces of additional information matches when the plurality of pieces of additional information overlap one another.

9. The information processing apparatus according to claim 8,
wherein the controller outputs the combined additional information in which the plurality of pieces of additional information referring to a synonym are integrated.

10. The information processing apparatus according to claim 8,
wherein the controller outputs the combined additional information in which the plurality of pieces of additional information are integrated, the plurality of pieces of additional information having strings for which a degree of similarity is equal to or larger than a threshold.

11. The information processing apparatus according to claim 1,
wherein the controller outputs the combined additional information indicating association between the plurality of pieces of additional information and attribute information associated with the plurality of pieces of additional information.

12. The information processing apparatus according to claim 11, wherein:
the controller causes a display device to display a screen based on the data which is output from the controller;
the controller receives an operation; and
when an operation of selecting the attribute information is received, the controller outputs the data in which a display state of additional information associated with the selected attribute information is different from a display state of additional information associated with attribute information that is not selected.

13. The information processing apparatus according to claim 11,
wherein the content of the plurality of pieces of additional information matches when the plurality of pieces of additional information overlap one another.

14. The information processing apparatus according to claim 13,
wherein the controller outputs the combined additional information in which the plurality of pieces of additional information referring to a synonym are integrated.

15. The information processing apparatus according to claim 13,
wherein the controller outputs the combined additional information in which the plurality of pieces of additional information are integrated, the plurality of pieces of additional information having strings for which a degree of similarity is equal to or larger than a threshold.

16. The information processing apparatus according to claim 1,
wherein the content of the plurality of pieces of additional information matches when the plurality of pieces of additional information overlap one another.

17. The information processing apparatus according to claim 16,
wherein the controller outputs the combined additional information in which the plurality of pieces of additional information referring to a synonym are integrated.

18. The information processing apparatus according to claim 16,
wherein the controller outputs the combined additional information in which the plurality of pieces of additional information are integrated, the plurality of pieces of additional information having strings for which a degree of similarity is equal to or larger than a threshold.

19. A non-transitory computer readable medium storing a program causing a computer to execute a process, the process comprising:
outputting data in which combined additional information is disposed in an image, when content of a plurality of pieces of additional information matches, wherein
the plurality of pieces of additional information are disposed in a plurality of copies of an identical image, and
the combined additional information is information in which the plurality of pieces of additional information are integrated.

* * * * *